United States Patent
Tanabe

(10) Patent No.: US 8,384,799 B2
(45) Date of Patent: Feb. 26, 2013

(54) IMAGE PROCESSING APPARATUS AND IMAGE PROCESSING METHOD

(75) Inventor: Kazuhiro Tanabe, Iruma (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 311 days.

(21) Appl. No.: 12/598,877

(22) PCT Filed: Mar. 5, 2008

(86) PCT No.: PCT/JP2008/053944
§ 371 (c)(1),
(2), (4) Date: Apr. 16, 2010

(87) PCT Pub. No.: WO2008/139769
PCT Pub. Date: Nov. 20, 2008

(65) Prior Publication Data
US 2010/0208097 A1     Aug. 19, 2010

(30) Foreign Application Priority Data
May 7, 2007  (JP) ................. 2007-122240

(51) Int. Cl.
*H04N 9/73* (2006.01)
*H04N 3/14* (2006.01)

(52) U.S. Cl. .................... 348/223.1; 348/272

(58) Field of Classification Search ......... 348/223.1, 348/222.1, 225.1, 229.1, 273, 272, 362, 221.1, 348/278–280, 300, 277, 294
See application file for complete search history.

(56) References Cited

U.S. PATENT DOCUMENTS

| 4,805,011 A * | 2/1989 | Sase ...................... 348/237 |
| 7,474,343 B2 * | 1/2009 | Kohashi et al. ............ 348/234 |
| 7,948,528 B2 * | 5/2011 | Takahashi et al. ......... 348/223.1 |
| 2007/0154203 A1 * | 7/2007 | Takahashi et al. ........... 396/213 |

FOREIGN PATENT DOCUMENTS

| JP | 2000354250 A  * | 12/2000 |
| JP | 2004-096633 |  3/2004 |
| JP | 2004120487 A  * | 4/2004 |
| JP | 2004-282452 | 10/2004 |
| JP | 2005-086630 |  3/2005 |

\* cited by examiner

*Primary Examiner* — Chieh M Fan
*Assistant Examiner* — Ahmed A Berhan
(74) *Attorney, Agent, or Firm* — Brundidge & Stanger, P.C.

(57) ABSTRACT

Both a high signal-to-noise ratio and wide dynamic range of the output video signal of a one-CCD color television camera are realized. An image signal processing apparatus of an imaging device using a solid-state image sensor in which different color filters are arranged includes an amplifying unit which amplifies color signals from the solid-state image sensor with a predetermined amplification factor, a separating unit which separates the color signals amplified by the amplifying unit into individual color signals, a white balance adjusting unit which subjects the separated color signals to white balance adjustment, a level detecting unit which detects a saturation level from the color signals subjected to the white balance adjustment depending on the amplification factor of the amplifying unit, a correction signal generating unit which generates correction signals from the other color signals than the color signal from which the saturation level is detected by the level detecting unit, and a first adding unit which adds the correction signals to the color signals subjected to the white balance adjustment.

2 Claims, 10 Drawing Sheets

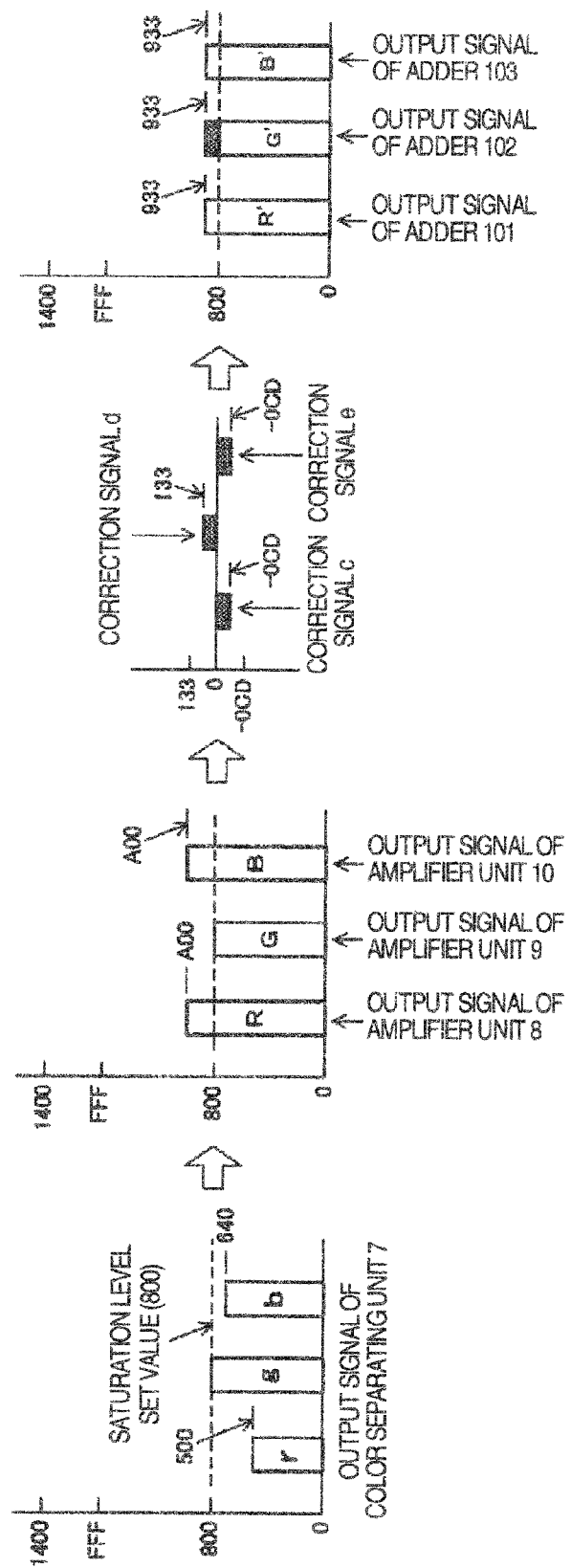

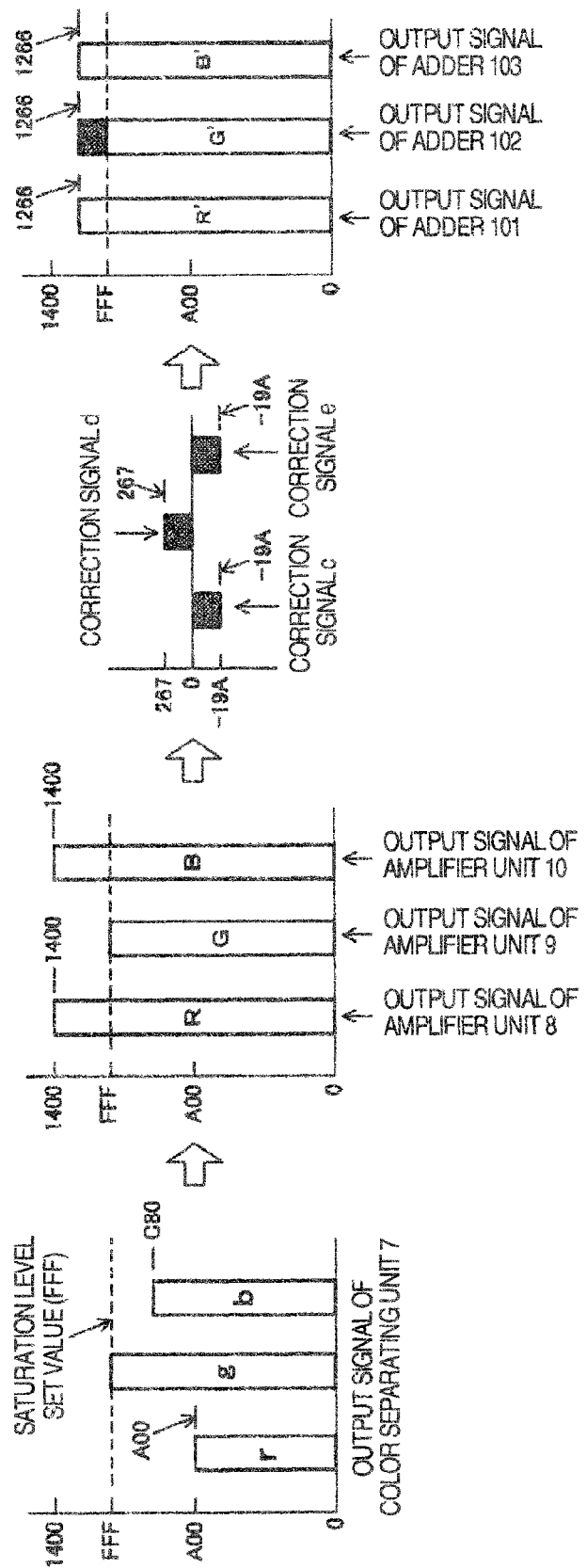

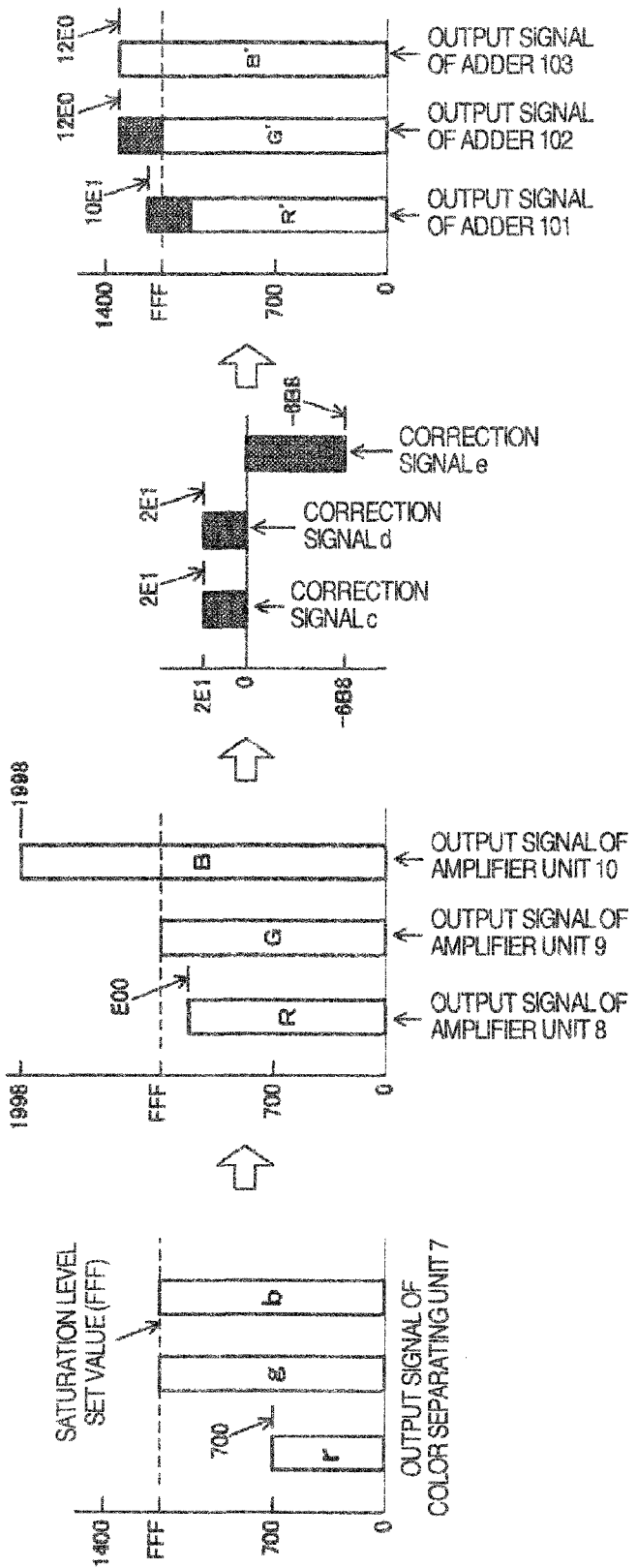

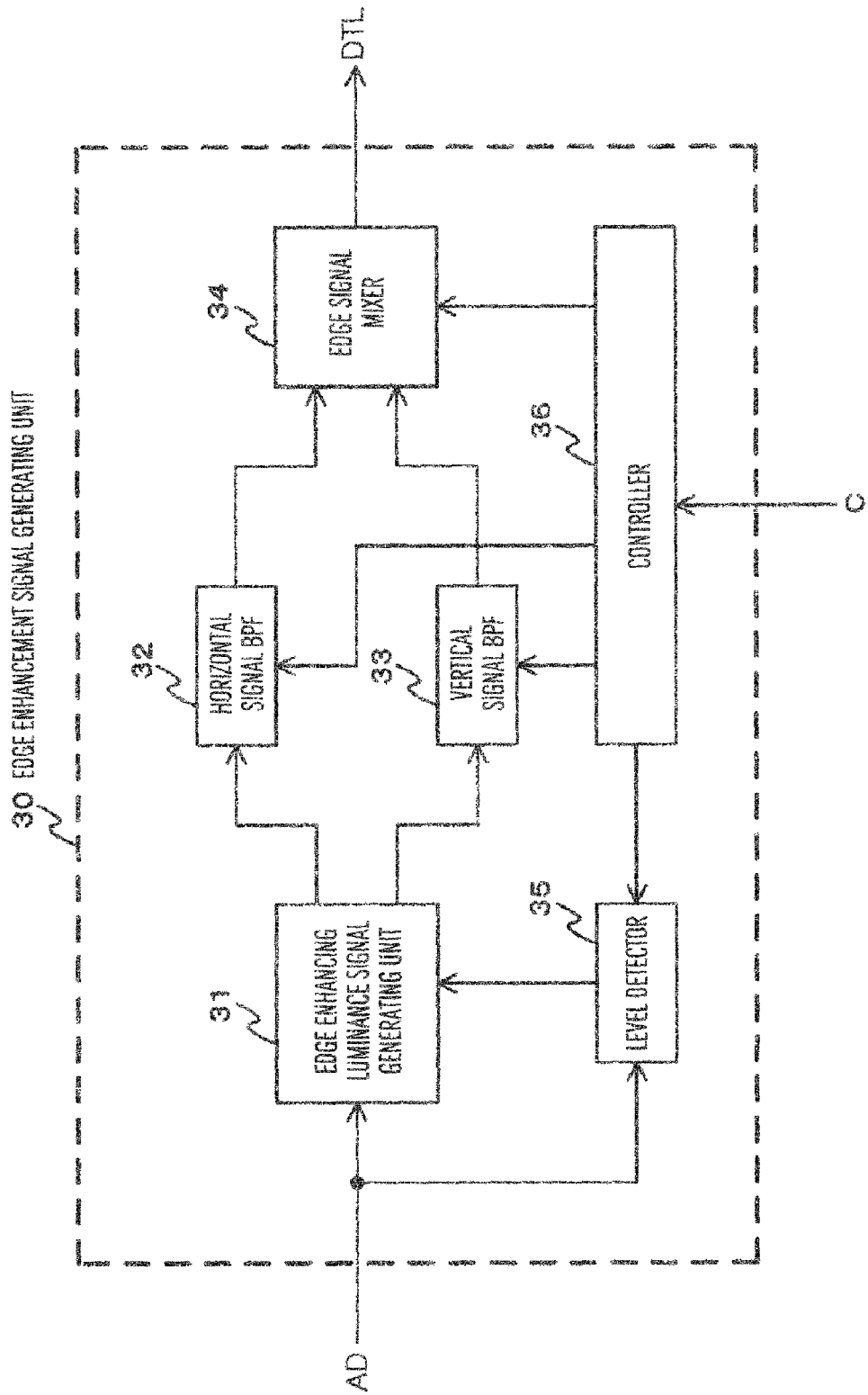

IMAGE PROCESSING APPARATUS AND IMAGE PROCESSING METHOD

CROSS REFERENCE TO RELATED APPLICATIONS

The present application claims priority from Japanese application JP2007-122240 filed on May 7, 2007 the content of which is hereby incorporated by reference into this application.

BACKGROUND OF THE INVENTION

1. Field of the Invention

The present invention relates to an imaging device such as a one-CCD color television camera using one solid-state image sensor, and particularly to an improvement in a dynamic range at the time when sensitivity is set with a high regard for a signal-to-noise ratio (S/N).

2. Description of the Related Art

In a three-CCD color television camera using three solid-state image sensors, a synthesis ratio of a luminance signal is conventionally changed without using an infrared ray-cutting filter for the purpose of improving a signal-to-noise ratio (S/N) (e.g., refer to Patent Document 1).

Patent Document 1: JP-A-2004-282452

In the above-described three-CCD color television camera using three solid-state image sensors, the signal-to-noise ratio (S/N) is improved by using no infrared ray-cutting filters and changing a synthesis ratio of the luminance signal. However, signal processing is not particularly performed with respect to a color signal.

BRIEF SUMMARY OF THE INVENTION

In view of the foregoing, it is an object of the present invention to realize both a high signal-to-noise ratio (S/N) and wide dynamic range of the output video signal of a one-CCD color television camera.

To accomplish the above-described objects, according to one aspect of the present invention, there is provided an image signal processing apparatus of an imaging device using a solid-state image sensor in which a plurality of different color filters are arranged. This apparatus includes: an amplifying unit which amplifies a plurality of color signals output from the solid-state image sensor with a predetermined amplification factor; a separating unit which separates the plurality of color signals amplified by the amplifying unit into individual color signals; a white balance adjusting unit which subjects the plurality of separated color signals to white balance adjustment; a level detecting unit which detects a saturation level from the plurality of color signals subjected to the white balance adjustment depending on the amplification factor of the amplifying unit; a correction signal generating unit which generates a correction signal from the other color signals different from the color signal from which the saturation level is detected by the level detecting unit; and a first adding unit which adds the correction signals generated by the correction signal generating unit to the plurality of color signals subjected to the white balance adjustment.

To accomplish the above-described objects, according to another aspect of the present invention, there is provided the image signal processing apparatus. This apparatus further includes: an edge enhancing unit; and a second adding unit, wherein: the edge enhancing unit generates an edge enhancement signal from the other color signals different from the color signal from which the saturation level is detected by the level detecting unit; and the second adding unit adds the edge enhancement signal to the plurality of color signals.

To accomplish the above-described objects, according to yet another aspect of the present invention, there is provided an image signal processing method of an imaging device using a solid-state image sensor in which a plurality of different color filters are arranged. This method includes: amplifying a plurality of color signals output from the solid-state image sensor with a predetermined amplification factor; separating the plurality of amplified color signals into individual color signals; subjecting the plurality of separated color signals to white balance adjustment; detecting a saturation level from the plurality of color signals subjected to the white balance adjustment depending on the amplification factor; generating a correction signal from the other color signals different from the color signal from which the saturation level is detected; and adding the correction signal to the plurality of color signals subjected to the white balance adjustment.

To accomplish the above-described objects, according to yet another aspect of the present invention, there is the image signal processing method. This method further includes: generating an edge enhancement signal from the other color signals different from the color signal from which the saturation level is detected; and adding the edge enhancement signal to the plurality of color signals.

ADVANTAGES OF THE INVENTION

According to the present invention, both a high signal-to-noise ratio (S/N) and wide dynamic range of the output video signal of a one-CDD color television camera are realized.

Other objects, features and advantages of the invention will become apparent from the following description of the embodiments of the invention taken in conjunction with the accompanying drawings.

BRIEF DESCRIPTION OF THE DRAWINGS

FIG. 3A is a diagram illustrating a level correction at the time of photographing an achromatic object according to one embodiment of the present invention;

FIG. 3B is a diagram illustrating a level correction at the time of photographing an achromatic object according to one embodiment of the present invention;

FIG. 4B is a diagram illustrating level correction at the time of photographing a chromatic object according to one embodiment of the present invention;

FIG. 8 is a block diagram illustrating an edge enhancement signal generating unit according to yet another embodiment of the present invention.

DESCRIPTION OF REFERENCE NUMERALS

Figure 1:
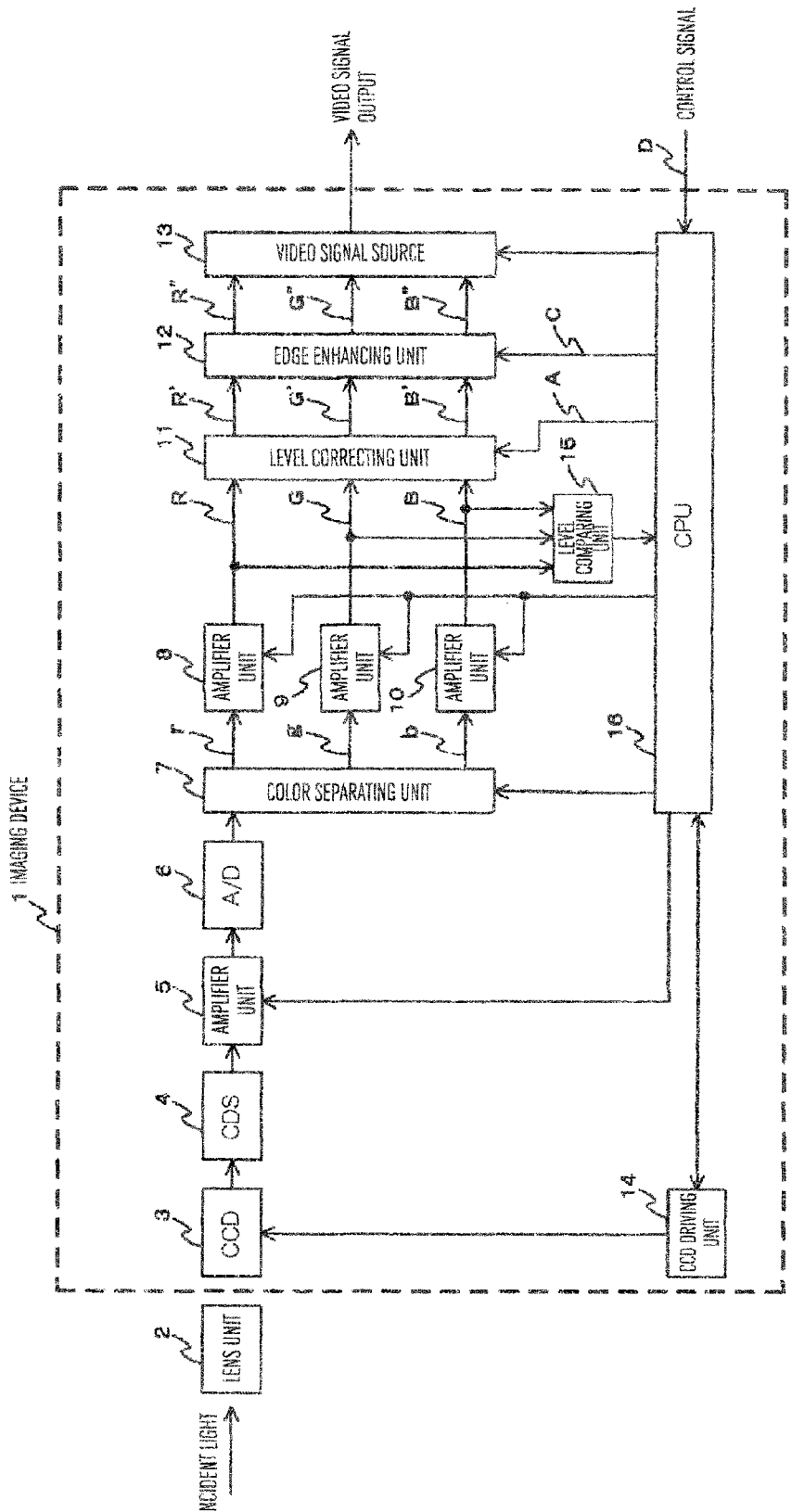
FIG. 1 is a block diagram illustrating an imaging device according to one embodiment of the present invention.

1: Imaging device
2: Lens unit
3: CCD image pickup device
4: CDS unit
5, 8, 9, 10: Amplifier unit
6: ND converter
7: Color separating unit
11: Level correcting unit
12: Edge enhancing unit
13: Video signal source
14: CCD driving unit
15: Level comparing unit
16: CPU
30: Edge enhancement signal generating unit
31: Edge enhancing luminance signal generating unit
32: Horizontal signal BPF
33: Vertical signal BPF
17, 18, 19, 101, 102, 103: Adder
104: Level detector
105: Correction signal generating unit
106: Controller
201, 202, 203, 207, 208, 209: Delay unit
204, 205, 206: Adder
210, 211, 212: Vertical edge signal generating unit
213: Horizontal edge signal generating unit
35, 214: Level detector
34, 215: Edge signal mixer
36, 216: Controller

DETAILED DESCRIPTION OF THE INVENTION

Hereinafter, one embodiment of an imaging device according to the present invention will be described with reference to FIG. 1.

FIG. 1 is a block diagram illustrating the imaging device according to one embodiment of the present invention.

Referring to FIG. 1, a reference numeral 1 denotes an imaging device, a reference numeral 2 denotes a lens unit which images incident light, a reference numeral 3 denotes a CCD (Charge Coupled Device) image pickup device which converts the light incident from the lens unit 2 into an electrical signal, a reference numeral 4 denotes a CDS (Correlated Double Sampling) unit which removes noise from signals output from the CCD image pickup device 3, a reference numeral 5 denotes an amplifier unit which adjusts a level of a signal output from the CDS unit 4, a reference numeral 6 denotes an A/D (Analog Digital) Converter which converts an analog signal output from the amplifier unit 5 into a signal A of a digital signal, a reference numeral 7 denotes a color separating unit which separates the digital signals output from the A/D Converter 6 to each digital video signal of a red color, green color, and blue color. A reference numeral 8 denotes an amplifier unit which adjusts a level of a red digital video signal (r signal) separated from the color separating unit 7 to output a R (Red) signal, a reference numeral 9 denotes an amplifier unit which adjusts a level of a green digital video signal (g signal) separated from the color separating unit 7 to output a G (Green) signal, a reference numeral 10 denotes an amplifier unit which adjusts a level of a blue digital video signal (b signal) separated from the color separating unit 7 to output a B (Blue) signal, and the amplifier units 8 to 10 each perform a white balance adjustment. A reference numeral 11 denotes a level correcting unit which applies the after-mentioned level correction to the supplied R signal, G signal, and B signal to output a R' signal, a G' signal, and a B' signal, respectively. A reference numeral 12 denotes an edge enhancing unit which subjects the R' signal, the G' signal, and the B' signal to the after-mentioned edge enhancement to output a R" signal, a G" signal, and a B" signal, respectively. A reference numeral 13 denotes a video signal source which converts the supplied R" signal, G" signal, and B" signal into video signals of a predetermined system for output, a reference numeral 14 denotes a CCD driving unit which drives the CCD image pickup device 3, a reference numeral 15 denotes a level comparing unit which compares levels of the respective digital video signals of the red color, green color, and blue color output from the amplifier units 8 to 10, and a reference numeral 16 denotes a CPU (Central Processing Unit) which controls each unit within the imaging device 1. Further, the CPU 16 controls the level correction unit 11 by the signal A, and controls the edge enhancing unit 12 by a signal C.

Examples of the video signal of the predetermined system output from the video signal source 13 include a RGB signal, and a moving image signal and still image signal of an NTSC (National Television System Committee) system, a PAL (Phase Alternating by Line) system, and an HDTV (High Definition TeleVision) system.

Next, operations according to one embodiment of the present invention will be described with reference to FIG. 1.

The CCD image pickup device 3 of the imaging device 1 photoelectrically converts the incident light imaged on a photoelectric converter by the lens unit 2 to output an electrical signal to the CDS unit 4. The CDS unit 4 removes noise from the signals output from the CCD image pickup device 3 to output the signals to the amplifier unit 5. The amplifier unit 5 amplifies the signals output from the CDS unit 4 based on a gain control signal output from the CPU 16, and outputs the signals to the A/D converter 6. The A/D converter 6 converts the analog signals output from the amplifier unit 5 into digital signals of, for example, 12 bits and outputs the digital signals to the color separating unit 7. According to the present embodiment, since a saturation level set value is changed depending on an amplification factor of the amplifier unit 5, the resolution of the A/D converter 6 is arbitrarily changed depending on the amplification factor of the amplifier unit 5. Based on the control signals output from the CPU 16, the color separating unit 7 separates the digital signals output from the A/D converter 6 into each digital video signal of a red color, a green color, and a blue color. Further, the color separating unit 7 outputs the red digital video signal (r signal) to the amplifier unit 8, outputs the green digital video signal (g signal) to the amplifier unit 9, and outputs the blue digital video signal (b signal) to the amplifier unit 10, respectively. The amplifier unit 8 adjusts a level of the red digital video signal (r signal) separated by the color separating unit 7 to output the R (Red) signal, the amplifier unit 9 adjusts a level of the green digital video signal (g signal) separated by the color separating unit 7 to output the G (Green) signal, and the amplifier unit 10 adjusts a level of the blue digital video signal (b signal) separated by the color separating unit 7 to output the B (Blue) signal. Further, based on the gain adjustment signal output from the CPU 16, the amplifier units 8 to 10 perform level matching for each of the supplied digital video signals of red color, green color, and blue color, that is, subject each signal to a white balance adjustment, and output each signal to the level correcting unit 11. The level correcting unit 11 applies the after-mentioned level correction to the supplied R signal, G signal, and B signal, and outputs the R' signal, the G' signal, and the B' signal to the edge enhancing unit 12. The edge enhancing unit 12 subjects the supplied R' signal, G' signal, and B' signal to the after-mentioned edge enhancement, and outputs the R" signal, the G" signal, and the B" signal to the image signal source 13. The image signal source 13 converts the supplied R" signal, G" signal, and B" signal into the video signals of the predetermined protocol to output the video signals. The CCD driving unit 14 outputs a signal for driving the CCD image pickup device 3 based on the control signal output from the CPU 16. The level comparing unit 15 compares levels of the respective digital video signals of R, G, and B output from the amplifier units 8 to 10, and outputs comparison result signals to the CPU 16. The CPU 16 controls the amplifier units 8 to 10 based on the control signal D produced from the outside and the comparison result signal produced by the level comparing unit 15. Further, the CPU 16 controls the level correcting unit 11 by the signal A, and controls the edge enhancing unit 12 by the signal C.

The sensitivity setting according to one embodiment of the present invention will be described with reference to FIGS. 1, 3A, and 3B.

A diagram on the extreme left of FIG. 3A illustrates the sensitivity setting with a high regard for a signal-to-noise ratio (S/N). The sensitivity setting is mainly performed by the gain control in the amplifier unit 5.

Suppose, for example, that the CCD image pickup device 3 illustrated in FIG. 1 is a one-CCD color image pickup device in which pixels are covered with red, green, and blue color filters. Since the CCD image pickup device 3 is covered with three color filters, transmissivity is different in each color filter. Further, since the photoelectric conversion rate is different from each other depending on a wavelength in the image pickup device, the sensitivity differences are caused among the red video signal, green video signal, and blue video signal output from the CCD image pickup device 3. In this sensitivity differences, supposing, for example, that the green video signal is set to 1, the red video signal is equal to 0.5 and the blue video signal is equal to 0.625. A diagram on the extreme left of FIG. 3A illustrates the above. In addition, one bar of the bar graph represents a level of one pixel of the CCD image pickup device 3 or that of one sampling of the A/D converter 6. For the purpose of setting the sensitivity with a high regard for S/N, a saturation level of a signal which is first saturated among the signals output from the CCD image pickup device 3, namely, the saturation level of the green video signal according to the present embodiment is required to be set. A way of setting the saturation level of the green video signal is as follows. Specifically, the green video signal in which the light amount higher than the maximum value of the photoelectrical conversion is entered into the CCD image pickup device 3 and which is produced from the CCD image pickup device 3 is set to the saturation level. Next, the CPU 16 controls the amplifier unit 5 to have a gain such that the g signal output from the color separating unit 7 reaches $(800)_h$. The present invention will be described, assuming that a gain of this amplifier unit 5 is 0 dB. The saturation level means the maximum value obtained by the photoelectric conversion of the CCD image pickup device 3, and therefore, when the green video signal reaches the maximum value, the electrical signal to be output is prevented from increasing regardless of how much the amount of incident light increases.

The level correction according to one embodiment of the present invention will be described with reference to FIGS. 1 to 3B.

Figure 2:
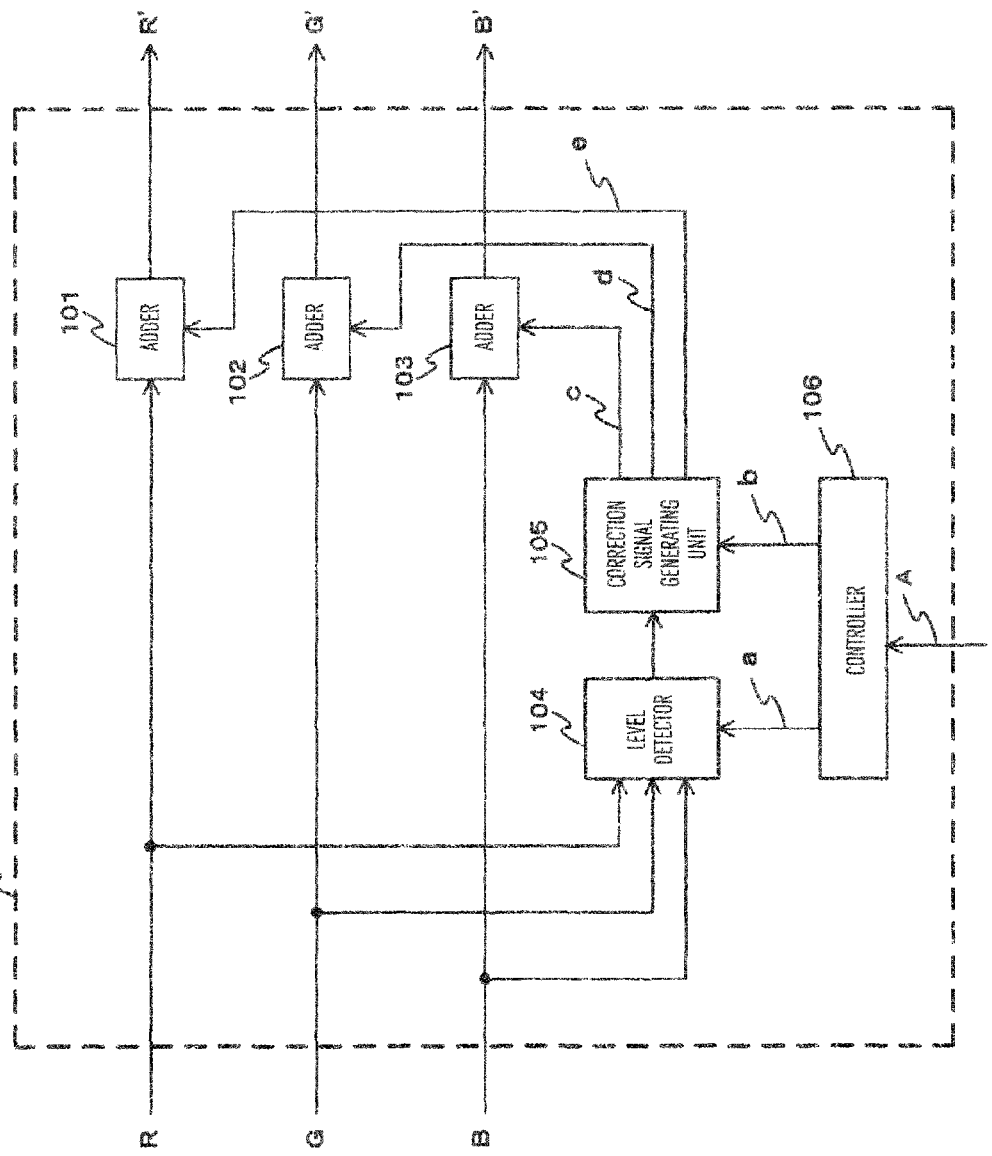
FIG. 2 is a block diagram illustrating a level correcting unit according to one embodiment of the present invention.

FIG. 2 is a block diagram illustrating the level correcting unit 11 of FIG. 1 in detail.

Referring to FIG. 2, a reference numeral 104 denotes a level detector which detects whether a level is saturated with the supplied R signal, G signal, and B signal, a reference numeral 105 denotes a correction signal generating unit which generates a correction signal with respect to a signal which reaches a saturation level by the level detector 104, reference numerals 101 to 103 each denote an adder which adds the correction signals output from the correction signal generating unit 105, and a reference numeral 106 denotes a controller which outputs signals a and b based on the signal A output from the CPU 16.

FIGS. 3A and 3B are diagrams illustrating the level correction according to one embodiment of the present invention. According to one embodiment, description will be made on the level correction at the time when the g signal reaches the saturation level, that is, the maximum output level of the A/D converter 6. Also when the r signal or the b signal is higher than the g signal in the sensitivity and the r signal or the b signal first reaches the saturation level, the same processing may be performed.

According to one embodiment, a diagram on the extreme left of FIG. 3A illustrates an output signal of the color separating unit 7 in the case of photographing an achromatic object and adjusting an aperture diaphragm (not shown) of the lens unit 2. The diagram illustrates the case where a gain of the amplifier unit 5 is 0 dB. Suppose that when the g signal is set to 1 at the output of the color separating unit 7, the r signal is equal to 0.5 and the b signal is equal to 0.625, respectively. Herein, suppose that only the g signal reaches the maximum output level of the A/D converter 6. The saturation level of the g signal output from the A/D converter 6 is represented as $(800)_h$ using a hexadecimal notation. The r signal output from the color separating unit 7 is represented as $(500)_h$, and the b signal is represented as $(640)_h$, respectively.

For the purpose of correcting the sensitivity difference of signals output from the CCD image pickup device 3, the signals are subjected to the white balance adjustment. The white balance adjustment is performed by the gain adjustment of the amplifier units 8 to 10. When a ratio of the g signal is set to 1, a gain of the amplifier unit 9 is equal to 1. When a ratio of the r signal is 0.5, a gain of the amplifier unit 8 is equal to 2 as an inverse number of the ratio of 0.5. The r signal is amplified by the amplifier unit 8, and $(A00)_h$ is output as the R signal. When a gain of the g signal amplified by the amplifier unit 9 is 1, the same $(800)_h$ as the input level is output as the G signal. When a ratio of the b signal is 0.625, a gain of the amplifier unit 10 is equal to 1.6 as an inverse number of the ratio of 0.625. The b signal is amplified by the amplifier unit 10, and $(A00)_h$ is output as the B signal. A second diagram from the left of FIG. 3A illustrates the above. In the diagram, even when the g signal is subjected to the white balance adjustment, a level difference exists. Its reason is that the saturation level of the g signal is assumed to reach the maximum output level of the A/D converter 6.

Next, operations of the level correcting unit 11 of FIG. 2 will be described.

The R signal, the G signal, and the B signal are supplied to the level correcting unit 11. The level detector 104 detects whether the supplied G signal reaches $(800)_h$ of the maximum output level of the A/D converter 6. As a result of the detection, when the supplied G signal is less than $(800)_h$, the correction signal generating unit 105 outputs the correction signal of '0' (zero). As apparent from the second diagram from the left of FIG. 3A, the level detector 104 detects that a level of the g signal reaches $(800)_h$, and the correction signal generating unit 105 generates the correction signal. The correction signal is generated based on the luminance signal YH. Supposing that the maximum level of the G signal is Lmax, the red signal coefficient is Kr, and the blue signal coefficient is Kb, a calculation formula (formula 1) of YH is as follows.

$$YH = Kr \times (R-Lmax) + Kb \times (B-Lmax) \quad \text{(formula 1)}$$

When the terms (R−Lmax) and (B−Lmax) are calculated, the calculation formulas are as follows.

$$R-Lmax = (A00)_h - (800)_h = (200)_h \quad \text{(formula 2)}$$

$$B-Lmax = (A00)_h - (800)_h = (200)_h \quad \text{(formula 3)}$$

When the red signal coefficient Kr and the blue signal coefficient Kb are 0.3, respectively, the following calculation formula is obtained.

$$YH = 0.3 \times (200)_h + 0.3 \times (200)_h = (133)_h \quad \text{(formula 4)}$$

When the R' signal, the G' signal, and the B' signal are generated from the calculated YH, the calculation formulas are as follows.

$$R' = R - (R-Lmax) + YH = (933)_h \quad \text{(formula 5)}$$

$$G' = G + YH = (933)_h \quad \text{(formula 6)}$$

$$B' = B - (B-Lmax) + YH = (933)_h \quad \text{(formula 7)}$$

From the calculated result, the correction signals e, d, and c are as follows, and the third diagram from the left of FIG. 3A illustrates the following.

$$e = R' - R = (933)_h - (A00)_h = -(OCD)_h \quad \text{(formula 8)}$$

$$d = G' - G = (933)_h - (800)_h = (133)_h \quad \text{(formula 9)}$$

$$c = B' - B = (933)_h - (A00)_h = -(OCD)_h \quad \text{(formula 10)}$$

The R signal is added to the correction signal e by the adder 101 to become the R' signal. The G signal is added to the correction signal d by the adder 102 to become the G' signal. The B signal is added to the correction signal c by the adder 103 to become the B' signal. A diagram on the extreme right of FIG. 3A illustrates the above, and the calculation formulas include formula 11 to formula 13.

$$R' = R + e = (933)_h \quad \text{(formula 11)}$$

$$G' = G + d = (933)_h \quad \text{(formula 12)}$$

$$B' = B + c = (933)_h \quad \text{(formula 13)}$$

Next, one embodiment illustrating the level correction at the time when a gain of the amplifier unit 5 is 6 dB will be described with reference to FIG. 3B.

A diagram on the extreme left of FIG. 3B illustrates an output signal of the color separating unit 7 in the case of photographing an achromatic object and adjusting an aperture diaphragm (not shown) of the lens unit 2 according to one embodiment. Suppose that when the g signal is set to 1 at the output of the color separating unit 7, the r signal is equal to 0.5 and the b signal is equal to 0.625. Herein, suppose that only the g signal reaches the maximum output level of the A/D converter 6. The saturation level of the g signal output from the A/D converter 6 is represented as $(FFF)_h$ using a hexadecimal notation. The r signal output from the color separating unit 7 is represented as $(A00)_h$, and the b signal is represented as $(C80)_h$, respectively.

For the purpose of correcting the sensitivity differences of signals output from the CCD image pickup device 3, the signals are subjected to the white balance adjustment. The white balance adjustment is performed by the gain adjustment of the amplifier units 8 to 10. When a ratio of the g signal is set to 1, a gain of the amplifier unit 9 is equal to 1. When a ratio of the r signal is 0.5, a gain of the amplifier unit 8 is equal to 2 as an inverse number of the ratio of 0.5. The r signal is amplified by the amplifier unit 8, and $(1400)_h$ is output as the R signal. When a gain of the g signal amplified by the amplifier unit 9 is 1, the same $(FFF)_h$ as the input level is output as the G signal. When a ratio of the b signal is 0.625, a gain of the amplifier unit 10 is 1.6 as an inverse number of the ratio of 0.625. The b signal is amplified by the amplifier unit 10, and $(1400)_h$ is output as the B signal. A second diagram from the left of FIG. 3B illustrates the above. In the diagram, even when the g signal is subjected to the white balance adjustment, a level difference exists. Its reason is that the saturation level of the g signal is assumed to reach the maximum output level of the A/D converter 6.

Next, operations of the level correcting unit 11 of FIG. 2 will be described.

The R signal, the G signal, and the B signal are supplied to the level correcting unit 11. The level detector 104 detects whether the supplied G signal reaches $(FFF)_h$ of the maximum output level of the A/D converter 6. As a result of the detection, when the supplied G signal is less than $(FFF)_h$, the correction signal generating unit 105 outputs the correction signal of '0' (zero). As apparent from the second diagram from the left of FIG. 3B, the level detector 104 detects that a level of the G signal reaches $(FFF)_h$, and the correction signal generating unit 105 generates the correction signal. The correction signal is generated based on the luminance signal YH. Supposing that the maximum level of the G signal is Lmax, the red signal coefficient is Kr, and the blue signal coefficient is Kb, a calculation formula (formula 14) of YH is as follows.

$$YH = Kr \times (R-Lmax) + Kb \times (B-Lmax) \quad \text{(formula 14)}$$

When the terms (R−Lmax) and (B−Lmax) are calculated, the calculation formulas are as follows.

$$R-Lmax = (1400)_h - (FFF)_h = (401)_h \quad \text{(formula 15)}$$

$$B-Lmax = (1400)_h - (FFF)_h = (401)_h \quad \text{(formula 16)}$$

When the red signal coefficient Kr and the blue signal coefficient Kb are 0.3, respectively, the following calculation formula is obtained.

$$YH = 0.3 \times (401)_h + 0.3 \times (401)_h = (267)_h \quad \text{(formula 17)}$$

When the R' signal, the G' signal, and the B' signal are generated from the calculated YH, the calculation formulas are as follows.

$$R' = R - (R-Lmax) + YH = (1266)_h \quad \text{(formula 18)}$$

$$G' = G + YH = (1266)_h \quad \text{(formula 19)}$$

$$B' = B - (B-Lmax) + YH = (1266)_h \quad \text{(formula 20)}$$

From the calculated result, the correction signals e, d, and c are as follows, and the third diagram from the left of FIG. 3B illustrates the following.

$$e = R' - R = (1266)_h - (1400)_h = -(19A)_h \quad \text{(formula 21)}$$

$$d = G' - G = (1266)_h - (FFF)_h = (267)_h \quad \text{(formula 22)}$$

$$c = B' - B = (1266)_h - (1400)_h = -(19A)_h \quad \text{(formula 23)}$$

The R signal is added to the correction signal e by the adder 101 to become the R' signal. The G signal is added to the correction signal d by the adder 102 to become the G' signal. The B signal is added to the correction signal c by the adder 103 to become the B' signal. A diagram on the extreme right of FIG. 3B illustrates the above, and the calculation formulas include formula 24 to formula 26.

$$R' = R + e = (1266)_h \quad \text{(formula 24)}$$

$$G'=G+d=(1266)_h \quad \text{(formula 25)}$$

$$B'=B+c=(1266)_h \quad \text{(formula 26)}$$

Figure 4A:
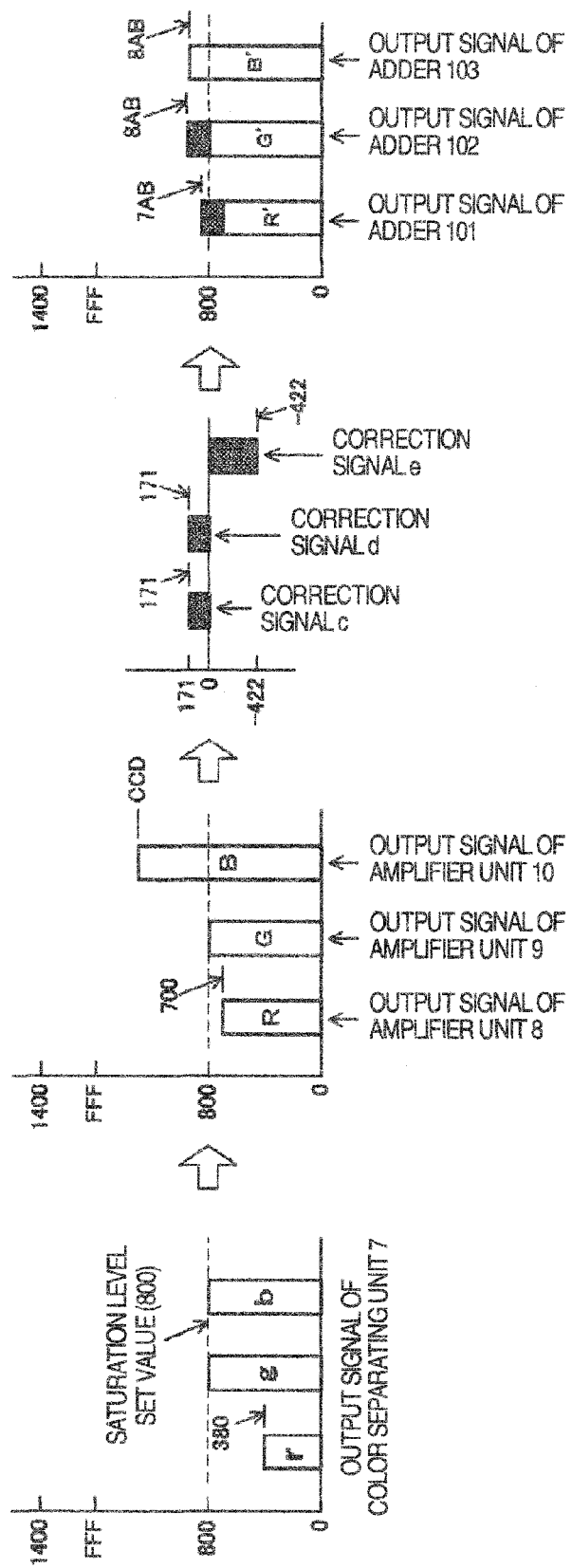
FIG. 4A is a diagram illustrating level correction at the time of photographing a chromatic object according to one embodiment of the present invention.

Next, according to one embodiment, a diagram on the extreme left of FIG. 4A illustrates an output signal of the color separating unit 7 in the case of photographing a chromatic object and adjusting an aperture diaphragm (not shown) of the lens unit 2. The diagram illustrates the case where a gain of the amplifier unit 5 is 0 dB. Herein, suppose that only the g signal reaches the saturation level. The r signal level output from the color separating unit 7 is represented as $(380)_h$, and the g signal level is represented as $(800)_h$, and the b signal level is represented as $(800)_h$, respectively.

Next, for the purpose of correcting the sensitivity differences of signals output from the CCD image pickup device 3, the signals are subjected to the white balance adjustment. The white balance adjustment is performed by the gain adjustment of the amplifier units 8 to 10. When a ratio of the g signal is set to 1, a gain of the amplifier unit 9 is equal to 1. When a ratio of the r signal is 0.5, a gain of the amplifier unit 8 is equal to 2 as an inverse number of the ratio of 0.5. The r signal is amplified by the amplifier unit 8, and $(700)_h$ is output as the R signal. When a gain of the g signal amplified by the amplifier unit 9 is 1, the same $(800)_h$ as the input level is output as the G signal. When a ratio of the b signal is equal to 0.625, a gain of the amplifier unit 10 is 1.6 as an inverse number of the ratio of 0.625. The b signal is amplified by the amplifier unit 10, and $(CCD)_h$ is output as the B signal. A second diagram from the left of FIG. 4A illustrates the above.

Next, operations of the level correcting unit 11 of FIG. 2 will be described.

The R signal, the G signal, and the B signal are supplied to the level correcting unit 11. The level detector 104 detects whether the supplied G signal reaches $(800)_h$ of the saturation level output from the A/D converter 6. As a result of the detection, when the supplied G signal is less than $(800)_h$, the correction signal generating unit 105 outputs the correction signal of '0' (zero). As apparent from the second diagram from the left of FIG. 4A, the level detector 104 detects that the G signal level reaches $(800)_h$, and the correction signal generating unit 105 generates the correction signal. The correction signal is generated based on the luminance signal YH (formula 1). When the terms (R−Lmax) and (B−Lmax) are calculated, the calculation formulas are as follows.

$$R-L\max=(700)_h-(800)_h=-(100)_h \quad \text{(formula 27)}$$

$$B-L\max=(CCD)_h-(800)_h=(4CD)_h \quad \text{(formula 28)}$$

Since the calculation result of the formula 27 becomes a negative value, the negative value is replaced with '0' (zero).

When the red signal coefficient Kr and the blue signal coefficient Kb are set to 0.3, respectively, the following calculation formula is obtained.

$$YH=0.3\times(0)_h+0.3\times(4CD)_h=(171)_h \quad \text{(formula 29)}$$

When the R' signal, the G' signal, and the B' signal are generated from the calculated YH, the calculation formulas are as follows.

$$R'=R-(R-L\max)+YH=(7AB)_h \quad \text{(formula 30)}$$

$$G'=G+YH=(8AB)_h \quad \text{(formula 31)}$$

$$B'=B-(B-L\max)+YH=(8AB)_h \quad \text{(formula 32)}$$

From the calculated result, the correction signals e, d, and c are as follows, and the third diagram from the left of FIG. 4A illustrates the following.

$$e=R'-R=(7AB)_h-(700)_h=(171)_h \quad \text{(formula 33)}$$

$$d=G'-G=(8AB)_h-(800)_h=(171)_h \quad \text{(formula 34)}$$

$$c=B'-B=(8AB)_h-(CCD)_h=-(422)_h \quad \text{(formula 35)}$$

The R signal is added to the correction signal e by the adder 101 to become the R' signal. The G signal is added to the correction signal d by the adder 102 to become the G' signal. The B signal is added to the correction signal c by the adder 103 to become the B' signal. A diagram on the extreme right of FIG. 4A illustrates the above, and the calculation formulas include formula 36 to formula 38.

$$R'=R+e=(7AB)_h \quad \text{(formula 36)}$$

$$G'=G+d=(8AB)_h \quad \text{(formula 37)}$$

$$B'=B+c=(8AB)_h \quad \text{(formula 38)}$$

There is the possibility that when a chromatic object is photographed, a hue is slightly deviated; however, since the level correction is performed to high-brightness parts, problems are not practically caused.

Next, according to one embodiment, a diagram on the extreme left of FIG. 4B illustrates a signal output from the color separating unit 7 in the case of photographing a chromatic object and adjusting an aperture diaphragm (not shown) of the lens unit 2.

This diagram illustrates the case where a gain of the amplifier unit 5 is 6 dB. Herein, suppose that only the g signal reaches the saturation level. The r signal level output from the color separating unit 7 is represented as $(700)_h$, the g signal level is represented as $(FFF)_h$, and the b signal level is represented as $(FFF)_h$, respectively.

Next, for the purpose of correcting the sensitivity difference of signals output from the CCD image pickup device 3, the signals are subjected to the white balance adjustment. The white balance adjustment is performed by the gain adjustment of the amplifier units 8 to 10. When a ratio of the g signal is set to 1, a gain of the amplifier unit 9 is equal to 1. When a ratio of the r signal is 0.5, a gain of the amplifier unit 8 is equal to 2 as an inverse number of the ratio of 0.5. The r signal is amplified by the amplifier unit 8, and $(E00)_h$ is output as the R signal. When a gain of the g signal amplified by the amplifier unit 9 is 1, the same $(FFF)_h$ as the input level is output as the G signal. When a ratio of the b signal is 0.625, a gain of the amplifier unit 10 is equal to 1.6 as an inverse number of the ratio of 0.625. The b signal is amplified by the amplifier unit 10, and $(1998)_h$ is output as the B signal. A second diagram from the left of FIG. 4B illustrates the above.

Next, operations of the level correcting unit 11 of FIG. 2 will be described.

The R signal, the G signal, and the B signal are supplied to the level correcting unit 11. The level detector 104 detects whether the supplied G signal reaches $(FFF)_h$ of the maximum output level from the A/D converter 6. As a result of the detection, when the supplied G signal is less than $(FFF)_h$, the correction signal generating unit 105 outputs the correction signal of '0' (zero). As apparent from the second diagram from the left of FIG. 4B, the level detector 104 detects that the G signal level reaches $(FFF)_h$, and the correction signal generating unit 105 generates the correction signal. The correction signal is generated based on the luminance signal YH (formula 1). When the terms (R−Lmax) and (B−Lmax) are calculated, the calculation formulas are as follows.

$$R-L\max=(E00)_h-(FFF)_h=-(1FF)_h \quad \text{(formula 39)}$$

$$B-L\max=(1998)_h-(FFF)_h=(999)_h \quad \text{(formula 40)}$$

Since the calculation result of the formula 39 becomes a negative value, the negative value is replaced with '0' (zero).

When the red signal coefficient Kr and the blue signal coefficient Kb are set to 0.3, respectively, the following calculation formula is obtained.

$$YH=0.3\times(0)_h+0.3\times(999)_h=(2E1)_h \quad \text{(formula 41)}$$

When the R' signal, the G' signal, and the B' signal are generated from the calculated YH, the calculation formulas are as follows.

$$R'=R-(R-L\max)+YH=(10E1)_h \quad \text{(formula 42)}$$

$$G'=G+YH=(12E0)_h \quad \text{(formula 43)}$$

$$B'=B-(B-L\max)+YH=(12E0)_h \quad \text{(formula 44)}$$

From the calculated result, the correction signals e, d, and c are as follows, and the third diagram from the left of FIG. 4B illustrates the following.

$$e=R'-R=(10E1)_h-(E00)_h=(2E1)_h \quad \text{(formula 45)}$$

$$d=G'-G=(12E0)_h-(FFF)_h=(2E1)_h \quad \text{(formula 46)}$$

$$c=B'-B=(1998)_h-(12E0)_h=-(6B8)_h \quad \text{(formula 47)}$$

The R signal is added to the correction signal e by the adder 101 to become the R' signal. The G signal is added to the correction signal d by the adder 102 to become the G' signal. The B signal is added to the correction signal c by the adder 103 to become the B' signal. A diagram on the extreme right of FIG. 4B illustrates the above, and the calculation formulas include formula 48 to formula 50.

$$R'=R+e=(10E1)_h \quad \text{(formula 48)}$$

$$G'=G+d=(12E0)_h \quad \text{(formula 49)}$$

$$B'=B+c=(12E0)_h \quad \text{(formula 50)}$$

There is the possibility that when a chromatic object is photographed, a hue is slightly deviated; however, since the level correction is performed to high-brightness parts, problems are not practically caused.

The level corrections of the level correcting unit 11 may be performed using a computer such as a CPU (Central Processing Unit).

Since the level correction of the level correcting unit 11 is performed with respect to the high-brightness parts higher than a rated level, an apparent dynamic range is spread.

Another embodiment of the present invention will be described.

Figure 5:
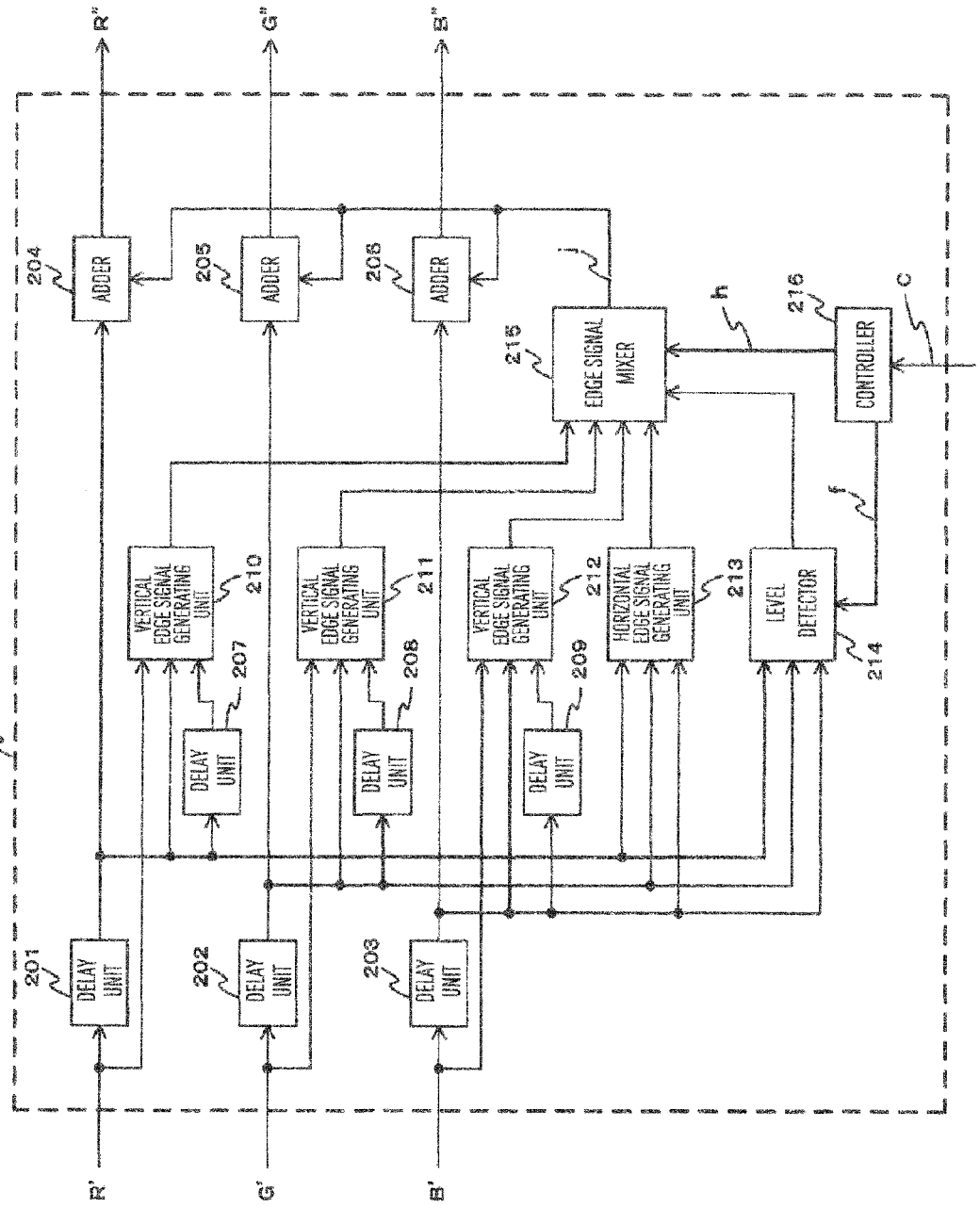
FIG. 5 is a block diagram illustrating an edge enhancing unit according to another embodiment of the present invention.

An edge enhancement will be described with reference to FIGS. 1, 5, and 6. FIG. 5 is a block diagram illustrating an edge enhancing unit 12 in detail according to another embodiment of the present invention, and FIG. 6 is a flowchart illustrating operations of edge enhancements according to another embodiment of the present invention.

Referring to FIG. 5, reference numerals 201 to 203 and 207 to 209 each denote a delay unit which delays one scanning line, reference numerals 204 to 206 each denote an adder which adds a video signal and an edge signal, a reference numeral 210 denotes a vertical edge signal generating unit which generates a vertical edge signal from the R' signal, a reference numeral 211 denotes a vertical edge signal generating unit which generates a vertical edge signal from the G' signal, a reference numeral 212 denotes a vertical edge signal generating unit which generates a vertical edge signal from the B' signal, a reference numeral 213 denotes a horizontal edge signal generating unit which generates a horizontal edge signal, a reference numeral 214 denotes a level detector which detects levels of the R' signal, G' signal, and B' signal having delayed therein one scanning line, a reference numeral 215 denotes an edge signal mixer which selects or mixes in a predetermined ratio the edge signals generated by the vertical edge signal generating units 210 to 212 and the horizontal edge signal generating unit 213, and a reference numeral 216 denotes a controller which outputs a control signal f for controlling the level detector 214 and a control signal h for controlling the edge signal mixer 215 from a control signal C output from the CPU 16.

Next, operations of the edge enhancing unit 12 will be described with reference to FIGS. 5 and 6.

Figure 6:
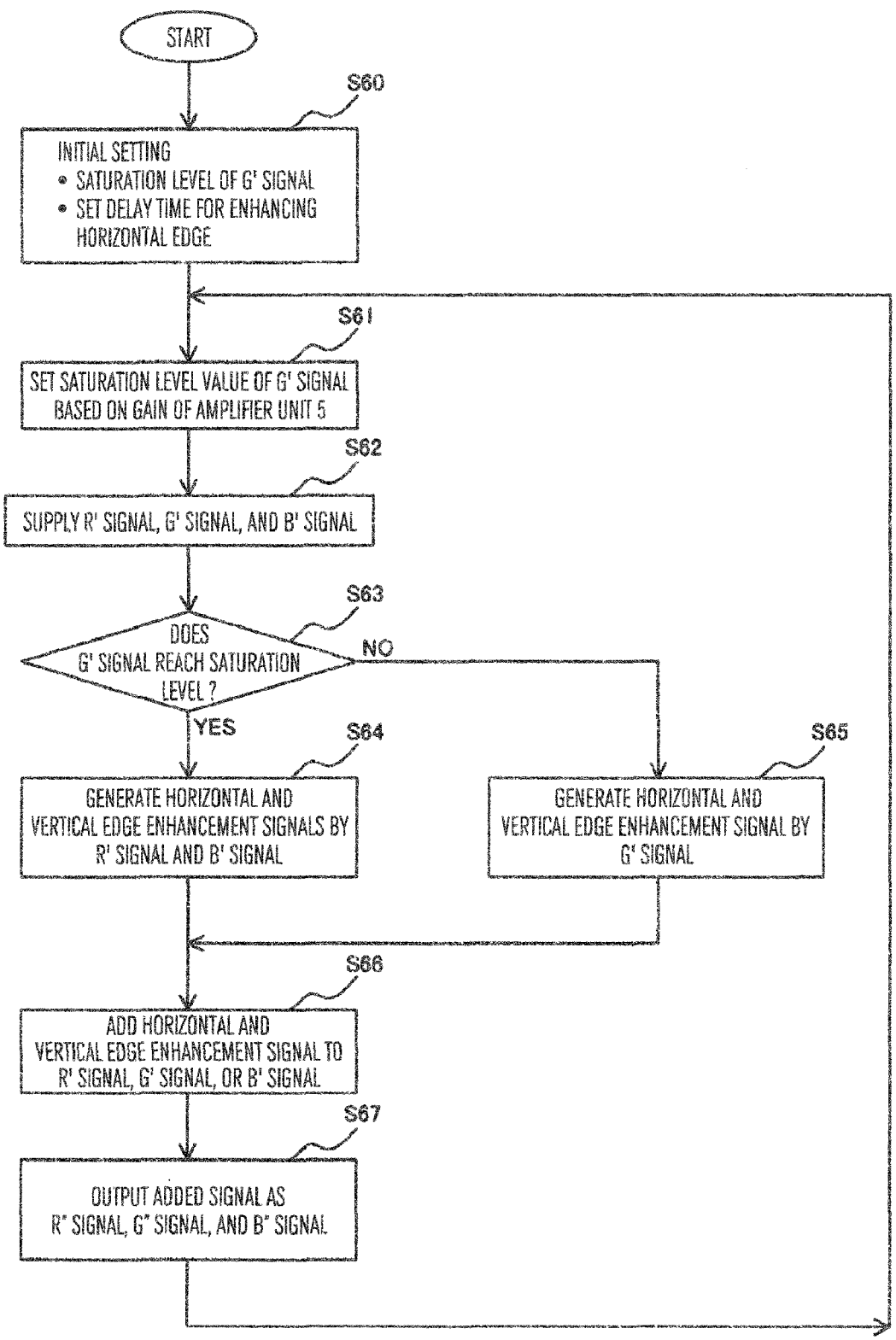
FIG. 6 is a flowchart for illustrating operations of edge enhancement according to another embodiment of the present invention.

In step S60 of FIG. 6, the edge enhancing unit 12 performs a setting of a saturation level of the G' signal and an initial setting of a delay time for enhancing a horizontal edge with respect to the controller 216. In step S61, the edge enhancing unit 12 sets the saturation level value of the G' signal based on the gain of the amplifier unit 5. In step S62, the edge enhancing unit 12 receives the R' signal, the G' signal, and the B' signal. In step S63, the level detector 214 determines whether the supplied G' signal reaches the saturation level. If the G' signal reaches the saturation level, the process goes to step S64, and if the G' signal is less than the saturation level, the process goes to step S65. In step S64, the edge signal mixer 215 receives the R' vertical edge signal output from the vertical edge signal generating unit 210, the B' vertical edge signal output from the vertical edge signal generating unit 212, and the R' horizontal edge signal and B' horizontal edge signal output from the horizontal edge signal generating unit 213, and generates a horizontal and vertical edge signal j, and the process goes to step S66. In step S65, the edge signal mixer 215 receives the G' vertical edge signal output from the vertical edge signal generating unit 211 and the G' horizontal edge signal output from the horizontal edge signal generating unit 213, and generates a horizontal and vertical edge signal j, and the process goes to step S66. In step S66, the adders 204 to 206 receive the edge signal j, and the process goes to step S67. In step S67, the adder 204 adds the edge signal j to the R' signal having delayed therein one scanning line to output the added signal as the R" signal. The adder 205 adds the edge signal j to the G' signal having delayed therein one scanning line to output the added signal as the G" signal. The adder 206 adds the edge signal j to the B' signal having delayed therein one scanning line to output the added signal as the B" signal, and the process returns to step S61.

In the edge enhancement according to another embodiment of the present invention, a color signal for generating the edge enhancement signal is changed based on whether the green signal reaches the saturation level. By doing so, since the edge enhancement is more performed with respect to high-brightness parts higher than a rated level of the red video signal, the green video signal, and the blue video signal, an apparent dynamic range is spread.

In the edge enhancement according to another embodiment of the present invention, the level correcting unit 11 may not apply the level correction to each signal.

The edge enhancement according to yet another embodiment will be described with reference to FIGS. 7 and 8.

Figure 7:
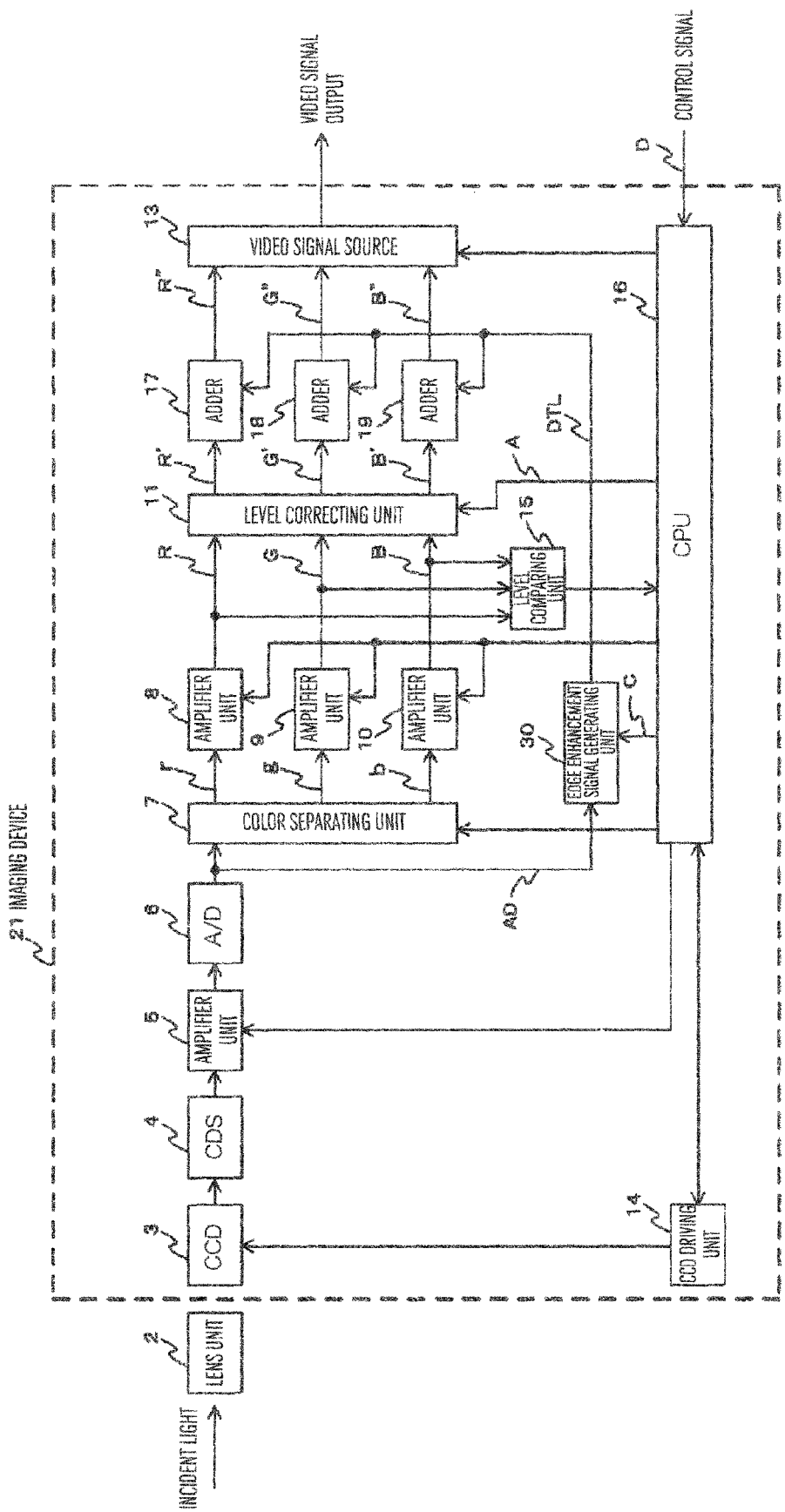
FIG. 7 is a block diagram illustrating an imaging device according to vet another embodiment of the present invention.

FIG. 7 is a block diagram illustrating an imaging device according to yet another embodiment of the present invention, and FIG. 8 is a block diagram illustrating an edge enhancement signal generating unit 30 in detail according to yet another embodiment of the present invention.

Referring to FIG. 7, a reference numeral 30 denotes an edge enhancement signal generating unit which generates an edge enhancement signal DTL from a digital signal AD output from the A/D converter 6, a reference numeral 17 denotes an adder which adds the edge enhancement signal DTL output from the edge enhancement signal generating unit 30 to the R' signal output from the level correcting unit 11 to output the R" signal, a reference numeral 18 denotes an adder which adds the edge enhancement signal DTL output from the edge enhancement signal generating unit 30 to the G' signal output from the level correcting unit 11 to output the G" signal, and a reference numeral 19 denotes an adder which adds the edge enhancement signal DTL output from the edge enhancement signal generating unit 30 to the B' signal output from the level correcting unit 11 to output the B" signal. Since operations of the other blocks in FIG. 7 are the same as those described in FIG. 1, the description will not be repeated.

Referring to FIG. 8, a reference numeral 31 denotes an edge enhancing luminance signal generating unit which generates horizontal and vertical edge enhancing luminance signals from the digital signal AD output from the A/D converter 6, a reference numeral 32 denotes a horizontal signal BPF (Band Pass Filter) which generates horizontal edge signals by passing signals in a predetermined frequency band from the horizontal edge enhancing luminance signals output from the edge enhancing luminance signal generating unit 31, a reference numeral 33 denotes a vertical signal BPF (Band Pass Filter) which generates vertical edge signals by passing signals in a predetermined frequency band from the vertical edge enhancing luminance signals output from the edge enhancing luminance signal generating unit 31, a reference numeral 34 denotes an edge signal mixer which mixes horizontal edge signals output from the horizontal signal BPF 32 and vertical edge signals output from the vertical signal BPF 33 to output the edge enhancement signal DTL, a reference numeral 35 denotes a level detector which detects a level of the digital signal AD, and a reference numeral 36 denotes a controller which receives the control signal C output from the CPU 16 to control the units within the edge enhancement signal generating unit 30.

Next, operations of the edge enhancement signal generating unit 30 will be described with reference to FIGS. 7 and 8.

The digital signal AD output from the A/D converter 6 of FIG. 7 is supplied to the edge enhancing luminance signal generating unit 31 and the level detector 35. The level detector 35 determines whether the green signal among the supplied digital signals AD reaches the saturation level, and outputs determination results to the edge enhancing luminance signal generating unit 31. Based on the determination result from the level detector 35, the edge enhancing luminance signal generating unit 31 generates, when the green signal is less than the saturation level, the horizontal edge enhancing luminance signals and the vertical edge enhancing luminance signals based on the green signal, and further, outputs the horizontal edge enhancing luminance signals to the horizontal signal BPF 32 and outputs the vertical edge enhancing luminance signals to the vertical signal BPF 33. Based on the determination result from the level detector 35, the edge enhancing luminance signal generating unit 31 generates, when the green signal reaches the saturation level, the horizontal edge enhancing luminance signals and the vertical edge enhancing luminance signals based on the red signal and the blue signal, and further, outputs the horizontal edge enhancing luminance signals to the horizontal signal BPF 32 and outputs the vertical edge enhancing luminance signals to the vertical signal BPF 33. The level detector 35 previously stores the saturation level value of the green signal in the CPU 16, and superimposes the saturation level value on the control signal C output from the CPU 16 to set the superimposed value via the controller 36. The horizontal signal BPF 32 passes only signals in a frequency band set by the controller 36 from among the supplied horizontal edge enhancing luminance signals, and generates the horizontal edge signals to output the signals to the edge signal mixer 34. The vertical signal BPF 33 passes only signals in a frequency band set by the controller 36 from among the supplied vertical edge enhancing luminance signals, and generates the vertical edge signals to output the signals to the edge signal mixer 34. The edge signal mixer 34 mixes and amplifies the supplied horizontal edge signals and vertical edge signals with a mixing ratio and amplification factor set by the controller 36, and generates and outputs the edge enhancement signal DTL. The adder 17 of FIG. 7 adds the R' signal and the edge enhancement signal DTL, and generates and outputs the R" signal. The adder 18 adds the G' signal and the edge enhancement signal DTL, and generates and outputs the G" signal. The adder 19 adds the B' signal and the edge enhancement signal DTL, and generates and outputs the B" signal.

In the edge enhancement according to yet another embodiment of the present invention, a color signal for generating the edge enhancement signal is changed based on whether the green signal reaches the saturation level. By doing so, since the edge enhancement is more performed with respect to higher-brightness parts higher than the rated level of the red video signal, the green video signal, and the blue video signal, an apparent dynamic range is spread.

Both a high signal-to-noise ratio (S/N) and wide dynamic range of the output video signal of a one-CCD color television camera are realized according to the above-described embodiment.

It is understood that the above-described set value or adjusted value may be allowed to hold a predetermined allowed value.

Further, the CCD image pickup device 3 according to the above-described embodiment is described with reference to the image pickup device in which pixels are covered with red (R), green (G), and blue (B) color filters; further, the present embodiment can be applied also to an image pickup device in which pixels are covered with color filters of green (G) primary color and cyan (Cy), yellow (Ye), and magenta (Mg) complementary colors.

Further, the above-described embodiment is described with reference to the CCD solid-state image sensor; further, can be applied also to an image pickup device or image pickup tube other than the CCD solid-state image sensor.

The present invention is described in detail above; further, it is understood that the present invention is not limited to the television camera herein described and the present invention can be widely applied to television cameras other than that described above.

The television camera according to the present invention has a wide dynamic range. As a result, when the television camera is applied to an inspection device or microscope, high-brightness parts of photographed objects can be turned into a clear image.

It should be further understood by those skilled in the art that although the foregoing description has been made on embodiments of the invention, the invention is not limited thereto and various changes and modification may be made without departing from the spirit of the invention and the scope of the appended claims.

The invention claimed is:

1. A color television camera comprising:
   a solid-state imaging unit which converts the light into electrical signals of a plurality of different colors, wherein the plurality of different colors includes green with a highest of sensitivities among the plurality of different colors;

an amplifying unit which amplifies a plurality of color signals corresponding to the plurality of different colors output from the solid-state image sensor with a predetermined amplification factor;

a separating unit which separates the plurality of color signals amplified by the amplifying unit into individual color signals;

a white balance adjusting unit which subjects the separated individual color signals to white balance adjustment;

a level detecting unit, which receives the separated individual color signals subjected to the white balance adjustment as input, and which detects whether the green signal subjected to the white balance adjustment reaches a saturation level of the green signal or not, the saturation level of the green signal depending on the amplification factor of the amplifying unit;

a correction signal generating unit which when the level detecting unit detects the saturation of the green signal, generates a luminance signal YH based on the saturated level of the green signal and other color signals;

a correction applying unit which outputs a corrected individual color signals obtained by respectively adding the luminance signal YH to the individual color signals subjected to the white balance adjustment, wherein, for an individual color signal larger than the saturation level of the green signal, the corrected individual color signal is replaced by a sum of the luminance signal YH and the saturation level of the green signal.

2. The color television camera according to claim 1, wherein the separated individual color signals consist of a red, green and blue signal, and the luminance signal YH is calculated by the following formula: $Y=Kr \times (R-Lmax)+Kb \times (B-Lmax)$, and wherein R and B represent a red and blue signal subjected to the white balance adjustment, Lmax represents saturated level of the green signal and Kr and Kb represents a red signal coefficient and a blue signal coefficient respectively, whereby (R−Lmax) and (B−Lmax) with negative value is replaced by 0.

* * * * *